(12) United States Patent
Kwak et al.

(10) Patent No.: US 11,569,674 B2
(45) Date of Patent: Jan. 31, 2023

(54) ELECTRONIC DEVICE AND METHOD FOR EXTENDING BATTERY LIFE

(71) Applicant: Samsung Electronics Co., Ltd., Suwon-si (KR)

(72) Inventors: Woongeun Kwak, Suwon-si (KR); Jungsik Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 228 days.

(21) Appl. No.: 17/127,129

(22) Filed: Dec. 18, 2020

(65) Prior Publication Data

US 2021/0194265 A1 Jun. 24, 2021

(30) Foreign Application Priority Data

Dec. 18, 2019 (KR) .......................... 10-2019-0170062

(51) Int. Cl.
*H02J 7/00* (2006.01)
(52) U.S. Cl.
CPC .............................. *H02J 7/007182* (2020.01)
(58) Field of Classification Search
None
See application file for complete search history.

(56) References Cited

U.S. PATENT DOCUMENTS

| | | | |
|---|---|---|---|
| 8,617,745 B2 | 12/2013 | Gozdz et al. | |
| 2008/0048621 A1* | 2/2008 | Yun | H02J 7/0031 320/136 |
| 2013/0234675 A1* | 9/2013 | King | H02J 7/02 320/163 |
| 2014/0217976 A1* | 8/2014 | McGrath | B60L 53/00 320/109 |

* cited by examiner

*Primary Examiner* — Arun C Williams

(57) ABSTRACT

According to an embodiment, an electronic device may include: a battery and at least one processor, wherein the at least one processor is configured to charge the battery up to a full-charge voltage of the battery when the full-charge voltage of the battery is a first full-charge voltage and the battery is charged repeated by a specified count with a second current value, set the full-charge voltage of the battery to a second full-charge voltage lower than the first voltage and when the full-charge voltage of the battery is the first full-charge voltage and the battery is charged repeatedly by the specified count with a first current value lower than the second current value, maintain the full-charge voltage of the battery to the first full-charge voltage.

20 Claims, 10 Drawing Sheets

ELECTRONIC DEVICE AND METHOD FOR EXTENDING BATTERY LIFE

CROSS-REFERENCE TO RELATED APPLICATION

This application is based on and claims priority under 35 U.S.C. § 119 to Korean Patent Application No. 10-2019-0170062 filed on Dec. 18, 2019, in the Korean Intellectual Property Office, the disclosure of which is herein incorporated by reference in its entirety.

BACKGROUND

1. Field

Various embodiments according to the disclosure relate to a battery of an electronic device, and relate to an electronic device and method for managing a battery life.

2. Description of Related Art

A battery is an energy storage device which converts energy generated by a chemical reaction into electrical energy and uses the energy. Examples of the battery include a primary cell, a secondary cell, and a fuel battery. In general, a battery which is not reusable because a reversible reaction does not occur when electric energy is applied again once a reaction occurs is called the primary cell, and a battery which is persistently reusable because a reversible reaction occurs repeatedly is called the secondary cell.

Recently, with the rapid development of mobile Information Technology (IT) applications, there is a growing increase in the demand of a lithium ion battery which occupies most of secondary cell markets. Since the lithium ion battery is lighter in weight and higher in energy density than other batteries, it is possible to implement with high capacity and high efficiency. Accordingly, it is widely applied not only to IT devices (e.g., a smartphone, a PDA, a laptop, a Table PC, etc.) and small home appliances but also to electric vehicles (e.g., an Electric Vehicle (EV) and a Plug-in Hybrid Electric Vehicle (PHEV)) and an Energy Storage System (ESS).

In addition, since the electronic device has recently become slim in design, the number of the existing replaceable and detachable batteries is decreasing, and the number of built-in batteries that cannot be arbitrarily removed by a user is increasing. Accordingly, inconveniently, the user cannot remove the battery and has to plug a charger to the electronic device to charge the built-in battery. A quick charging technique has been introduced to resolve the user's inconvenience by reducing a long charging time, and research on a related technique is actively underway.

How frequently charging and discharging occur is a first factor among factors affecting an aging degree of lithium ion batteries. With the increase in the frequency of charging and discharging, there is a deterioration in a battery cell, which results in an increase in an aging degree of the cell.

A quick charging technique which is recently introduced is a second factor. Although the user's inconvenience on the long charging time is resolved, swelling may occur in the quick charging technique. When power is applied to a battery, electrons move from a positive electrode to a negative electrode, and at the same time, lithium ions separated from the positive electrode are inserted into the negative electrode by passing through a separator, and such a process is called an intercalation. However, when quick charging results in an increase in a charge current, the lithium ions cannot be inserted into the negative electrode and thus are deposited as metallic lithium. That is, when the quick charging is continued, the deposition of metallic lithium continues to increase, and as a result, the negative electrode may penetrate the separator to meet the positive electrode, resulting in a short circuit. The short occurring inside the battery causes heat generation of the battery, which results in swelling of the battery. In addition, when over-charging and over-discharging are repeated, gas is produced from an electrolyte inside a battery cell, which may cause swelling of the battery. Such a phenomenon in which the battery swells is called a swelling phenomenon. When a thickness of the battery cell becomes thick due to the swelling phenomenon, a mechanical stress is applied to the inside of the battery, which affects an aging degree of the battery.

In order to manage the aging degree of such a lithium ion battery, it is necessary to accurately calculate a battery's cycle life and control a charge voltage or the like. According to an embodiment, when an accumulative charging amount of the battery reaches 100%, it is determined as one-time charging to count the number of cycles, and a charge voltage is decreased when exceeding a specific number of times. However, in the quick charging recently introduced, the charge voltage shall be decreased quicker than normal charging to prevent over-charging. Nevertheless, if a method of counting the number of cycles is applied equally to the quick charging, a timing for decreasing the charge voltage is delayed. If the timing of decreasing the charge voltage is delayed in the quick charging, the battery of the electronic device is repeatedly overcharged, and aging progresses rapidly due to a stress applied to the inside of the battery.

Therefore, in various embodiments according to the disclosure, for the effective use of the battery, a charge voltage or the like is controlled by counting the number of cycles in consideration of a charging environment.

SUMMARY

According to an embodiment, an electronic device may include: a battery and at least one processor, wherein the at least one processor is configured to charge the battery up to a full-charge voltage of the battery when the full-charge voltage of the battery is a first full-charge voltage and the battery is charged repeated by a specified count with a second current value, set the full-charge voltage of the battery to a second full-charge voltage lower than the first voltage and when the full-charge voltage of the battery is the first full-charge voltage and the battery is charged repeatedly by the specified count with a first current value lower than the second current value, maintain the full-charge voltage of the battery to the first full-charge voltage.

According to an embodiment a method of operating an electronic device may include charging a battery of the electronic device up to a full-charge voltage of the battery when the full-charge voltage of the battery is a first full-charge voltage and the battery is charged repeated by a specified count with a second current value, setting the full-charge voltage of the battery to a second full-charge voltage lower than the first voltage and when the full-charge voltage of the battery is the first full-charge voltage and the battery is charged repeatedly by the specified count with a first current value lower than the second current value, maintaining the full-charge voltage of the battery to the first full-charge voltage.

An electronic device and method in various embodiments of the disclosure can manage aging of a battery in response to various charging environments such as quick charging or the like.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the disclosure and its advantages, reference is now made to the following description taken in conjunction with the accompanying drawings, in which like reference numerals represent like parts.

DETAILED DESCRIPTION

FIGS. 1 through 10, discussed below, and the various embodiments used to describe the principles of the disclosure in this patent document are by way of illustration only and should not be construed in any way to limit the scope of the disclosure. Those skilled in the art will understand that the principles of the disclosure may be implemented in any suitably arranged system or device.

Figure 1:
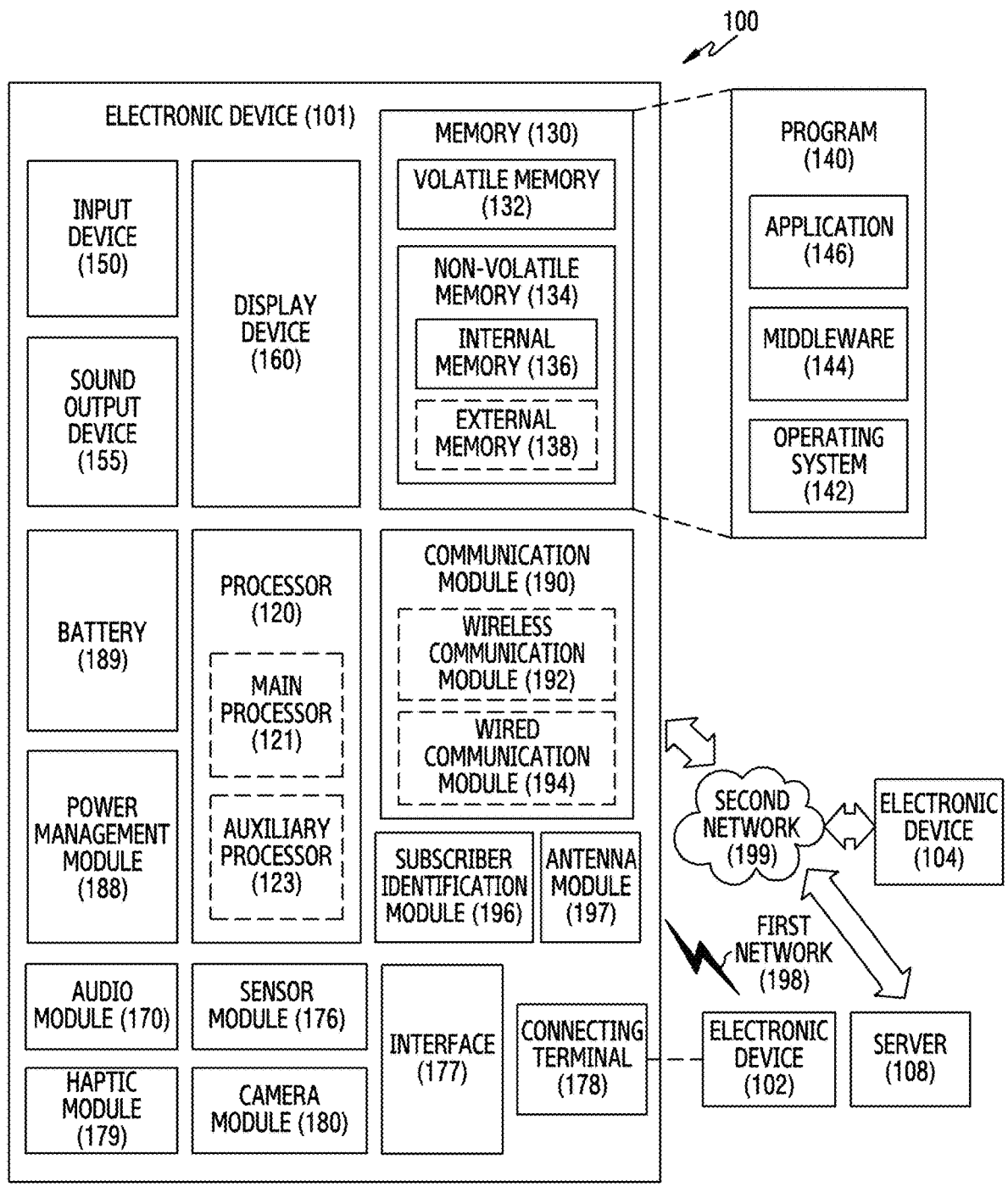
FIG. 1 illustrates a block diagram of an electronic device in a network environment according to various embodiments.

FIG. 1 illustrates a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally, or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as BLUETOOTH, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked.

The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PLAYSTORE), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively, or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
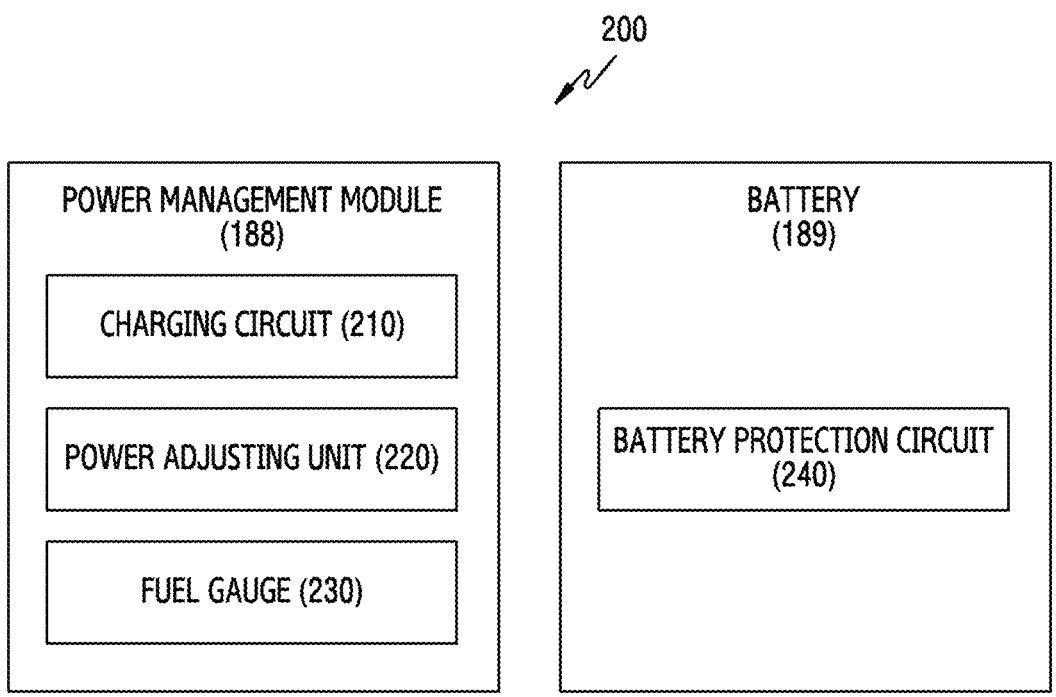
FIG. 2 illustrates a block diagram for a power management module and a battery according to various embodiments.

FIG. 2 illustrates a block diagram 200 illustrating the power management module 188 and the battery 189 according to various embodiments.

Referring to FIG. 2, the power management module 188 may include charging circuitry 210, a power adjuster 220, or a power gauge 230. The charging circuitry 210 may charge the battery 189 by using power supplied from an external power source outside the electronic device 101. According to an embodiment, the charging circuitry 210 may select a charging scheme (e.g., normal charging or quick charging) based at least in part on a type of the external power source (e.g., a power outlet, a USB, or wireless charging), magnitude of power suppliable from the external power source (e.g., about 20 Watt or more), or an attribute of the battery 189, and may charge the battery 189 using the selected charging scheme. The external power source may be connected with the electronic device 101, for example, directly via the connecting terminal 178 or wirelessly via the antenna module 197.

The power adjuster 220 may generate a plurality of powers having different voltage levels or different current levels by adjusting a voltage level or a current level of the power supplied from the external power source or the battery 189. The power adjuster 220 may adjust the voltage level or the current level of the power supplied from the external power source or the battery 189 into a different voltage level or current level appropriate for each of some of the components included in the electronic device 101. According to an embodiment, the power adjuster 220 may be implemented in the form of a low drop out (LDO) regulator or a switching regulator. The power gauge 230 may measure use state information about the battery 189 (e.g., a capacity, a number of times of charging or discharging, a voltage, or a temperature of the battery 189).

The power management module 188 may determine, using, for example, the charging circuitry 210, the power adjuster 220, or the power gauge 230, charging state information (e.g., lifetime, over voltage, low voltage, over current, over charge, over discharge, overheat, short, or swelling) related to the charging of the battery 189 based at least in part on the measured use state information about the battery 189. The power management module 188 may determine whether the state of the battery 189 is normal or abnormal based at least in part on the determined charging state information. If the state of the battery 189 is determined to abnormal, the power management module 188 may adjust the charging of the battery 189 (e.g., reduce the charging current or voltage, or stop the charging). According to an embodiment, at least some of the functions of the power management module 188 may be performed by an external control device (e.g., the processor 120).

The battery 189, according to an embodiment, may include a protection circuit module (PCM) 240. The PCM 240 may perform one or more of various functions (e.g., a pre-cutoff function) to prevent a performance deterioration of, or a damage to, the battery 189. The PCM 240, additionally or alternatively, may be configured as at least part of a battery management system (BMS) capable of performing various functions including cell balancing, measurement of battery capacity, count of a number of charging or discharging, measurement of temperature, or measurement of voltage.

According to an embodiment, at least part of the charging state information or use state information regarding the battery 189 may be measured using a corresponding sensor (e.g., a temperature sensor) of the sensor module 176, the power gauge 230, or the power management module 188. According to an embodiment, the corresponding sensor (e.g., a temperature sensor) of the sensor module 176 may be included as part of the PCM 240, or may be disposed near the battery 189 as a separate device.

Figure 3:
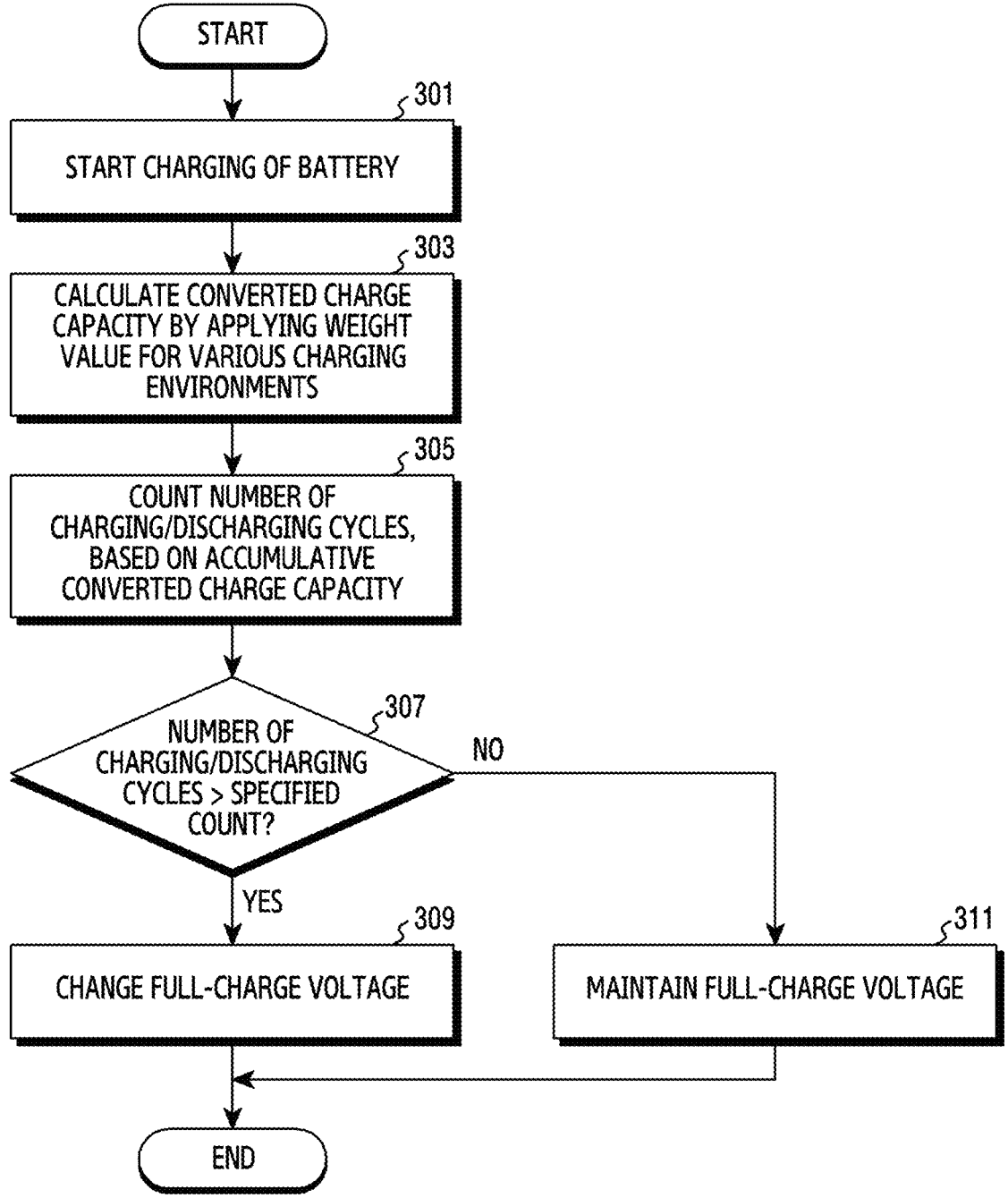
FIG. 3 illustrates a flowchart illustrating an electronic device for changing or maintaining a full-charge voltage by applying a weight value for a battery charging environment according to an embodiment.

FIG. 3 illustrates a flowchart illustrating an electronic device for changing or maintaining a full-charge voltage by applying a weight value for a battery charging environment according to an embodiment.

Referring to FIG. 3, in operation 301, an electronic device (e.g., the electronic device 101 of FIG. 1) may start charging of a battery (e.g., the battery 189 of FIGS. 1 and 2) by using power supplied through an external power device. For example, the external power device may correspond to at least one of a charging devices (e.g., an adapter or a cable) and an auxiliary battery. The battery of the electronic device may perform charging through a Constant Current (CC) control, which may be changed to a Constant Voltage (CV) control when reaching to a pre-set full-charge voltage. When a current supplied to the battery drops below a specific current value during the CV control, the electronic device may determine that the battery is fully charged.

In an embodiment, in operation 303, the electronic device 101 may calculate a converted charge capacity by applying a weight value for various charging environments. For example, when there is a change in a charging environment such as a quick charging environment (e.g., a charge rate exceeding 1.0 C) compared to a normal charging environment (e.g., a charge rate of 1.0 C) and a charging environment under a low-voltage condition (e.g., a charge rate of 0.2 C), a processor (e.g., the processor 120 of FIG. 1) may control a charge current, and may apply the weight value differently to a real charge capacity. Herein, C is a unit that represents a current rate (C-rate), and may be determined to correspond to the total capacity of a battery. Therefore, 1.3 C which is for a battery having a capacity of 30 Ah may imply a current value of 39 A, and 2.0 C may imply a current value of 60 A. The change in the charging environment may include a change in a charging environment such as not only quick charging (high current) and charging at a low-voltage condition but also charging at low temperature and moving to high temperature after being fully charged. When a weight factor is applied according to the charging environment, the processor 120 may calculate a converted charge capacity different from the real charge capacity. The weight factor may be set according to a weight table which is pre-set depending on a charge current and/or a full-charge voltage.

TABLE 1

|  | A first full-charge | A second full-charge |
| --- | --- | --- |
| A first current value | A first value of a first weight value | A second value of a first weight value |
| A second current value | A first value of a second weight value | A second value of a second weight value |

Table 1 shows a pre-set weight value to be applied to a real charge capacity according to a charge current (a first current value and a second current value) and a full-charge voltage (a first full-charge voltage and a second full-charge voltage). A first weight factor may include a weight value (a first value, a second value, etc.) to be applied when charged with the first current value. A second weight factor may include a weight value (e.g., a first value, a second value, etc.) to be applied when charged with the second current value higher than the first current value. For example, for the charging to the first full-charge voltage, the first current value may be set for a normal charging environment (e.g., a charge rate of 1.0 C), and the second current value may be set for a quick charging environment (e.g., a charge rate of 2.0 C). In an embodiment, when a battery having a capacity of 30 Ah is charged by 10% with a current of 1.0 C, the processor 120 may calculate a converted charge capacity to 11% by applying a weight value of the first value (e.g., 1.1) in the first weight factor. In another embodiment, when the battery having the capacity of 30 Ah is charged by 10% with a current of 2.0 C, the processor 120 may calculate the converted charge capacity to 15% by applying a weight value of the first value (e.g., 1.5) in the second weight factor. The first current value and/or the second current value may imply a charge current value in not only a normal charging environment and a quick charging environment but also a low-voltage charging condition, a low-temperature charging condition, or the like.

In an embodiment, the processor 120 may accumulate the converted charge capacity to calculate an accumulative converted charge capacity.

In an embodiment, in operation 305, the electronic device 101 may count the number of charging and discharging cycles, based on the accumulative converted charge capacity. For example, when the accumulative converted charge capacity calculated in operation 303 reaches 100%, the processor 120 may count this as one time. Since a battery capacity decreases when the battery of the electronic device 101 is repeatedly charged and discharged, the electronic device 101 may count the number of charging and discharging cycles to manage aging of the battery.

In an embodiment, in operation 307, the electronic device 101 may determine whether the number of charging and discharging cycles exceeds a specified count. For example, if it is identified in operation 307 that the number of charging and discharging cycles exceeds the specified count, the processor 120 may change a full-charge voltage in operation 309, and may maintain the full-charge voltage in operation 311 if not exceeding the specified count.

Figure 4:
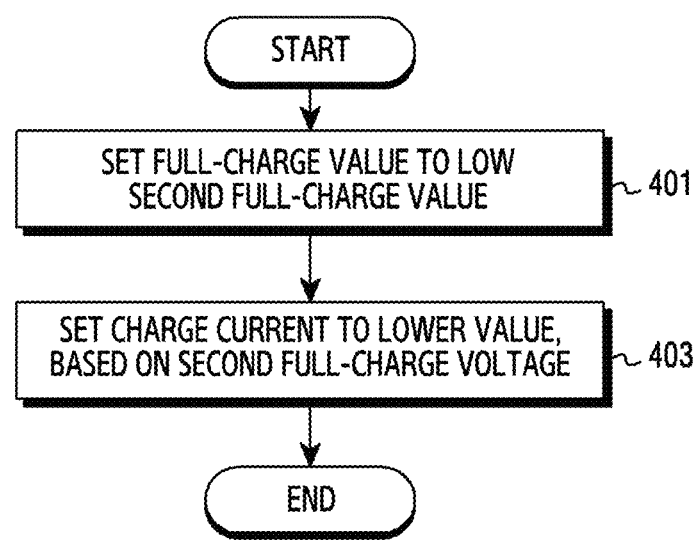
FIG. 4 illustrates a flowchart for controlling a charge current when a full-charge voltage of a battery is changed in an electronic device according to an embodiment.

FIG. 4 illustrates a flowchart for controlling a charge current when a full-charge voltage of a battery is changed in an electronic device according to an embodiment.

Referring to FIG. 4, in operation 401, an electronic device (e.g., the electronic device 101 of FIG. 1) may change a full-charge voltage when the number of charging and discharging cycles of a battery (e.g., the battery 189 of FIGS. 1 and 2) exceeds a specified count (e.g., 309 of FIG. 3). In an embodiment, a processor (e.g., the processor 120 of FIG. 1) may set the full-charge voltage, which is pre-set to a first full-charge voltage, to a second full-charge voltage lower than the first full-charge voltage.

In an embodiment, in operation 403, the electronic device 101 may set a charge current to a lower value, based on the second full-charge voltage. For example, when the number of charging and discharging cycles of the battery 189 exceeds the specified count (e.g., 100), in a battery having a capacity of 3000 mAh, a battery cell corresponding to a capacity of 300 mAh may be a dead cell which no longer functions as a battery cell. For the battery, the processor 120 may set the charge current, which is lowered from a charge current (e.g., 3 A) depending on a first full-charge voltage to a charge current (e.g., 2.7 A) depending on the second full-charge voltage.

Figure 5:
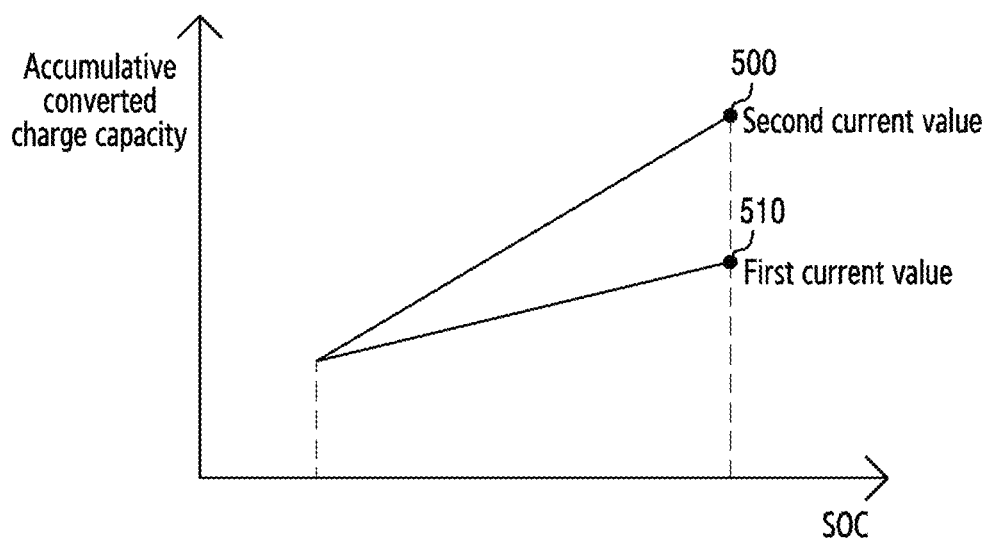
FIG. 5 illustrates a graph illustrating an accumulative converted charge capacity depending on a weight value, based on a charge current value of a battery, in an electronic device according to an embodiment.

FIG. 5 illustrates a graph illustrating an accumulative converted charge capacity depending on a weight value, based on a charge current value of a battery, in an electronic device according to an embodiment.

Figure 6:
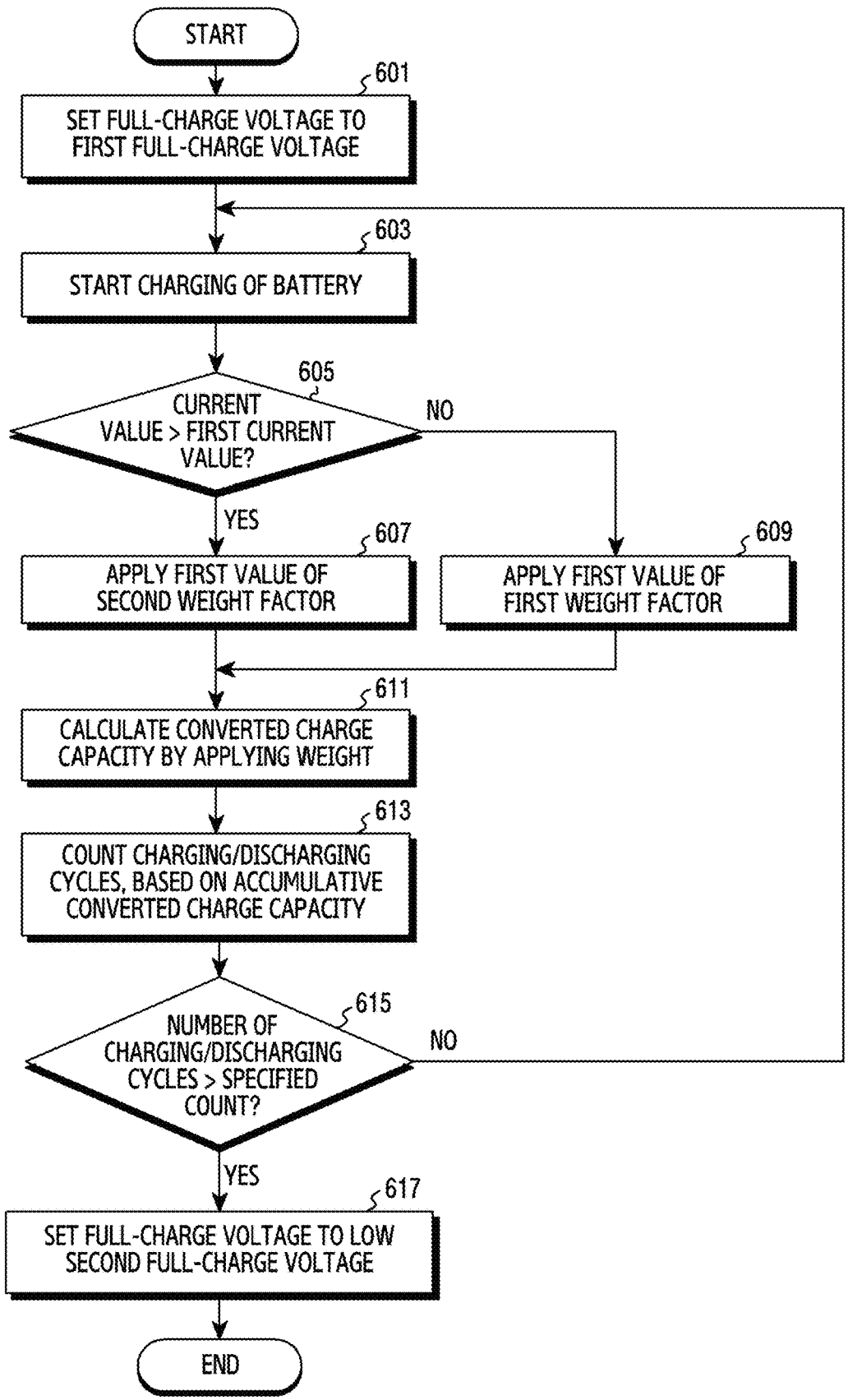
FIG. 6 illustrates a flowchart for controlling a full-charge voltage by counting the number of charging and discharging cycles, based on a charge current value of a battery, in an electronic device according to an embodiment.

Referring to FIG. 5, when charging is achieved in a specific State of Charge (SOC) range with a first current value (such as the first current value 510 of FIG. 5), a processor (e.g., the processor 120 of FIG. 1) may calculate the accumulative converted charge capacity by applying a first weight factor. In an embodiment, when charging is achieved in the specific SOC range with a second current value higher than the first current value (such as the second current value 500 of FIG. 5), the processor 120 may calculate the accumulative converted charge capacity by applying a second weight factor higher than the first weight factor. For example, the processor 120 may charge a battery having a capacity of 30 Ah by using a current of 1.3 C or a current of 2.0 C. FIG. 6 is a flowchart for controlling a full-charge voltage by counting the number of charging and discharging cycles, based on a charge current value of a battery, in an electronic device according to an embodiment. Descriptions corresponding to or identical or similar to the aforementioned descriptions may be omitted in the descriptions of FIG. 6.

Referring to FIG. 6, in operation 601, an electronic device (e.g., the electronic device 101 of FIG. 1) may set a full-charge voltage of a battery (e.g., the battery 189 of FIGS. 1 and 2) included in the electronic device 101 to a first full-charge voltage. For example, the first full-charge voltage may be set to 4.33V. However, in various embodiments, the first full-charge voltage may be set to a different value depending on a size and capacity of the battery, and a model, manufacturer, or the like of the electronic device. For example, the processor (e.g., the processor 120 of FIG. 1) may set the first full-charge voltage to be higher than a second full-charge voltage.

In an embodiment, in operation 603, the electronic device 101 may receive power supplied through an external power device. The electronic device 101 may start charging of the battery 189 by using the power supplied from the external power device.

In an embodiment, in operation 605, the electronic device 101 may identify whether a current value exceeds a first current value. For example, if it is identified in operation 605 that the current value exceeds the first current value, the current value may be called a second current value. In operation 607, the processor 120 may apply a first value of the second weight factor to the second current value.

If it is identified in operation 605 that the current value does not exceed the first current value, in operation 609, the processor 120 may apply a first value of the first weight factor to the first current value.

For example, if charging is achieved in a specific SOC range as shown in FIG. 5, the processor 120 may apply the first value of the first weight factor to the first current value, and may apply the first value of the second weight factor to the second current value. In an embodiment, the processor 120 may set the first value of the first weight factor to 1.1, and may set the first value of the second weight factor to 1.5. However, in various embodiments, the first and second values of the first and second weight factors may be set to different values according to a pre-set weight table. The weight table may be a table for a weight value applied differently depending on a charging environment. The charging environment may include at least one of a normal charging environment, a quick charging (high current) environment, a charging environment under a low-voltage condition, a charging environment under low temperature, and a charging environment such as moving to high temperature after being fully changed. In an embodiment, the processor 120 may set the second weight factor to be higher than the first weight factor.

In operation 611, the electronic device 101 may calculate a converted charge capacity by applying the first weight factor or the second weight factor. In an embodiment, the processor 120 may calculate an accumulative converted charge capacity by accumulating the calculated converted charge capacity. When the weight factor is applied in operation 611 according to a charge current value, the processor 120 may calculate a converted charge capacity different from a real charge capacity. In an embodiment, the processor 120 may calculate a converted charge capacity for a case where charging is achieved using the second current value so as to be greater than a converted charge capacity for a case where charging is achieved using the first current value.

In an embodiment, in operation 613, the electronic device 101 may count the number of charging and discharging cycles, based on the accumulative converted charge capacity. When charging is repeated using the second current value according to an embodiment, the processor 120 may calculate the accumulative converted charge capacity (e.g., 90%) by applying the first value (e.g., 1.1) of the first weight factor. When charging is repeated using the second current value according to an embodiment, the processor 120 may calculate the accumulative converted charge capacity (e.g., 110%) by applying the first value (e.g., 1.5) of the second weight factor. In regard this, the processor 120 may count the number of charging and discharging cycles as one with respect to charging in which the accumulative converted charge capacity first reaches 100% with the second current value.

In an embodiment, in operation 615, the electronic device 101 may identify whether the number of charging and discharging cycles exceeds a specified count. For example, if it is identified in operation 615 that the number of charging and discharging cycles exceeds the specified count, in operation 617, the processor 120 may set the full-charge voltage, which is lowered from the first full-charge voltage (e.g., 4.33V) to the second full-charge voltage (e.g., 4.31V).

If it is identified in operation 615 that the number of charging and discharging cycles does not exceed the specified count, returning to operation 603, the processor 120 may repeat the subsequent operations.

Figure 7:
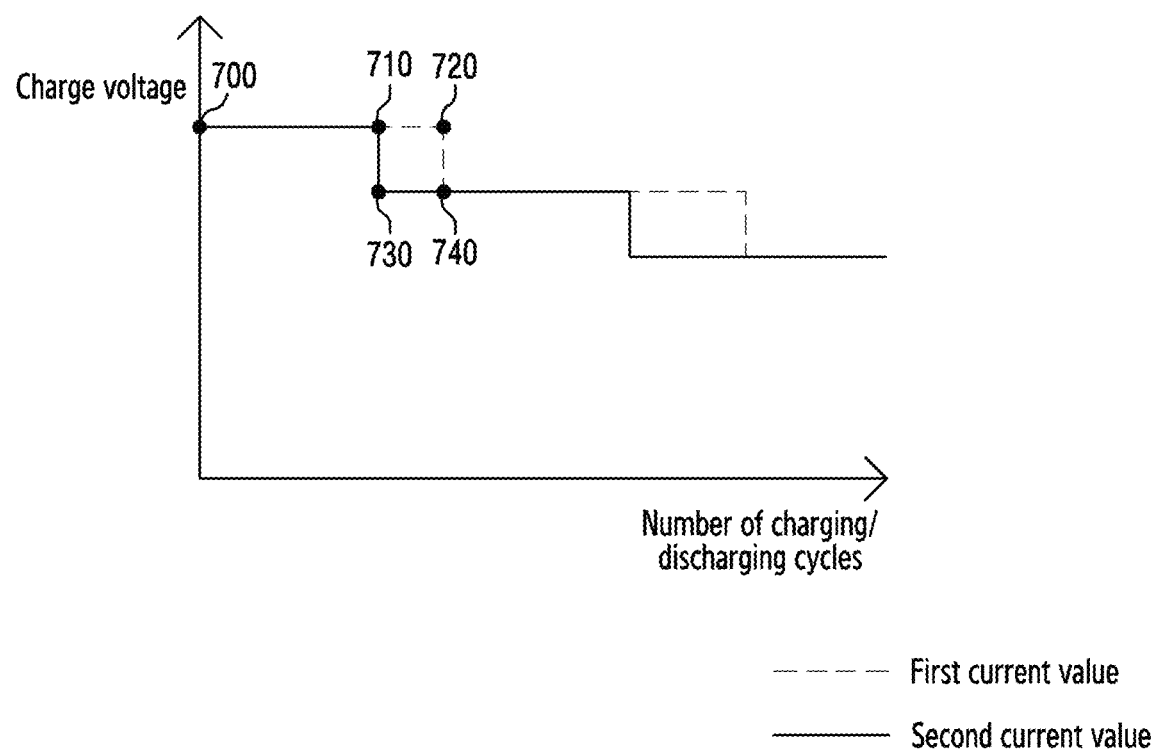
FIG. 7 illustrates a graph illustrating a change in a full-charge voltage depending on the number of charging and discharging cycles, based on a charge current value of a battery, in an electronic device according to an embodiment.

FIG. 7 illustrates a graph illustrating a change in a full-charge voltage depending on the number of charging and discharging cycles, based on a charge current value of a battery, in an electronic device according to an embodiment.

Referring to FIG. 7, a processor (e.g., the processor 120 of FIG. 1) may set a first current value to 1.3 C and may set a second current value to 2.0 C (quick charging). In an embodiment, the processor 120 may start charging with the first current value, i.e., 1.3 C, and may calculate an accumulative converted charge capacity by applying a first weight factor. In an embodiment, the processor 120 may start charging with the second current value, i.e., 2.0 C, and may calculate an accumulative converted charge capacity by applying a second weight factor higher than the first weight factor. For example, for a specific SOC range, the accumulative converted charge capacity for a case where charging is achieved with the second current value, i.e., 2.0 C, may be greater than the accumulative converted charge capacity for a case where charging is achieved with the first current value, i.e., 1.3 C.

In an embodiment, when the number of charging and discharging cycles of a battery (e.g., the battery 189 of FIGS. 1 and 2) depending on the accumulative converted charge capacity exceeds the specified count (such as timings 710 and 720), the processor 120 may decrease a full-charge voltage of the battery 189 (e.g., 710→730, 720→740). For example, the processor 120 may set a timing 710 of decreasing the full-charge voltage of the battery 189 when charging is achieved with the second current value, i.e., 2.0 C, to a timing earlier than a timing 720 of decreasing the full-charge voltage of the battery when charging is achieved with the first current value, i.e., 1.3 C. In an embodiment, the timing of decreasing the full-charge voltage of the battery may be set by considering not only a quick charging condition but also all environments such as a low-voltage charging condition, a low-temperature charging condition, or the like.

Figure 8:
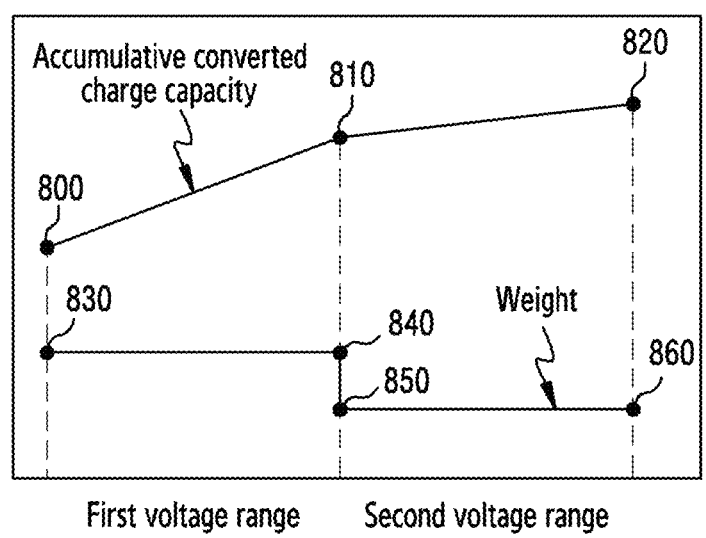
FIG. 8 illustrates a graph illustrating an accumulative converted charge capacity depending on a weight value, based on a charge voltage range of a battery, in an electronic device according to an embodiment.

FIG. 8 illustrates a graph illustrating an accumulative converted charge capacity depending on a weight value, based on a charge voltage range of a battery, in an electronic device according to an embodiment.

Referring to FIG. 8, when a battery (e.g., the battery 189 of FIGS. 1 and 2) is charged with a first current value, a processor (e.g., the processor 120 of FIG. 1) may calculate an accumulative converted charge capacity by applying a first value of a first weight factor to a first voltage range. For example, when the first value (is a range from 830 to 840) of the first weight factor is applied to the first voltage range, the accumulative converted charge capacity (such as reference number 800) at a start point of the first voltage range and the accumulative converted charge capacity (such as reference number 810) at an end point thereof may be calculated. In an embodiment, the processor 120 may calculate the accumulative converted charge capacity by applying a second value of the first weight factor to a second voltage range. For example, when the second value (is a range from 850 to 860) of the first weight factor is applied to the second voltage range, the accumulative converted charge capacity (such as reference number 810) at a start point of the second voltage range and the accumulative converted charge capacity (such as reference number 820) at an end point thereof may be calculated. In an embodiment, the first value of the first weight factor may be a value greater than the second value.

For example, when a battery which is 0% at 3.4V is charged up to 60% at 3.9V, a voltage range from 3.4V to 3.7V may be called a first voltage range, and a voltage range from 3.7V to 3.9V may be called a second voltage range. The processor 120 may charge the battery to 40% out of 60% which is a total charge capacity in the first voltage range and 20% out of 60% which is a total charge capacity in the second voltage range.

In an embodiment, the processor 120 may calculate a converted charge capacity for the charge capacity 40% as 48% by applying a weight value of 1.2 (the range from 830 to 840) to the first voltage range.

In an embodiment, the processor 120 may calculate a converted charge capacity for the charge capacity 20% as 18% by applying a weight value of 0.9 (the range from 850 to 860) to the second voltage range. Therefore, the processor 120 may calculate an accumulative converted charge capacity as 66%, which may be a value greater than 60%, i.e., a real charge capacity. In an embodiment, the accumulative converted charge capacity calculated by the processor 120 may be a value smaller than the real charge capacity.

Figure 9:
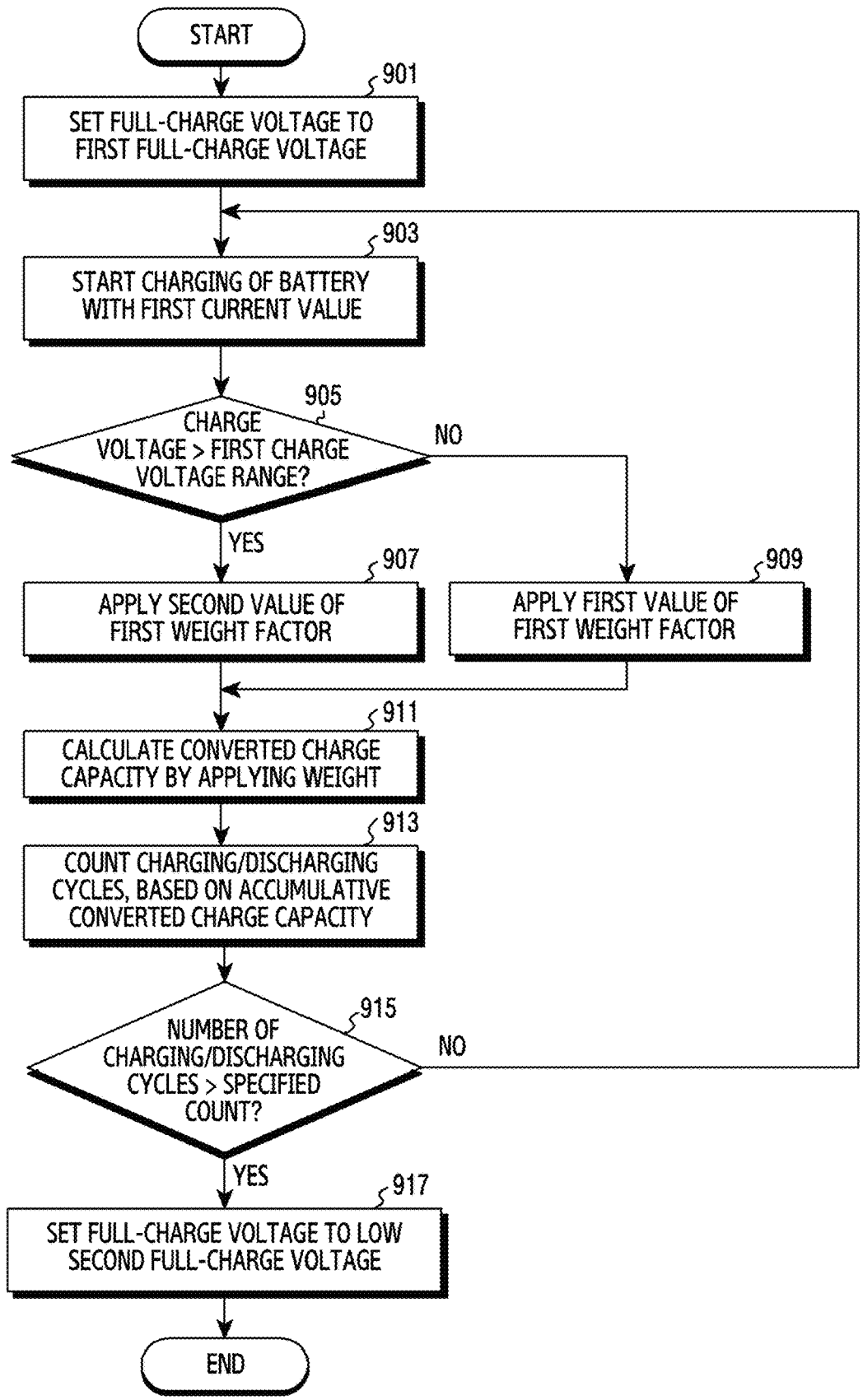
FIG. 9 illustrates a flowchart for controlling a full-charge voltage by counting the number of charging and discharging cycles, based on a charge voltage of a battery, in an electronic device according to an embodiment.

FIG. 9 illustrates a flowchart for controlling a full-charge voltage by counting the number of charging and discharging cycles, based on a charge voltage of a battery, in an electronic device according to an embodiment. Descriptions corresponding to or identical or similar to the aforementioned descriptions may be omitted in the descriptions of FIG. 9.

Referring to FIG. 9, in operation 901, an electronic device (e.g., the electronic device 101 of FIG. 1) may set a full-charge voltage of a battery (e.g., the battery 189 of FIGS. 1 and 2) included in the electronic device 101 to a first full-charge voltage. For example, a processor (e.g., the processor 120 of FIG. 1) may set the first full-charge voltage to be higher than a second full-charge voltage of operation 917.

In an embodiment, in operation 903, the electronic device 101 may receive power supplied through an external power device. The electronic device 101 may start charging of the battery 189 by using the power supplied from the external power device. In an embodiment, the electronic device 101 may start charging of the battery 189 by using one of a first current value and a second current value.

In an embodiment, when the electronic device 101 is charged with the first current value, in operation 905, the electronic device 101 may identify whether a charge voltage value exceeds a first charge voltage range. For example, if it is identified in operation 905 that the charge voltage value exceeds the first charge voltage range, a voltage range to which a corresponding charge voltage value belongs may be called a second charge voltage range (e.g., from 810 to 820 of FIG. 8). In operation 907, the processor 120 may apply a second value of a first weight factor to the second charge voltage range. According to an embodiment, for a case where the electronic device 101 is charged with the second current value, the processor 120 may apply a second value of the second weight factor.

If it is identified in operation 905 that the charge voltage value belongs to the first charge voltage range (e.g., from 800 to 810 of FIG. 8), in operation 909, the processor 120 may apply the first value of the first weight factor to the first charge voltage range. According to an embodiment, for a case where the electronic device 101 is charged with the second current value, the processor 120 may apply the first value of the second weight factor.

In operation 911, the electronic device 101 may calculate a converted charge capacity by applying the first weight factor or the second weight factor. In an embodiment, the processor 120 may calculate an accumulative converted charge capacity by accumulating the calculated converted charge capacity. In an embodiment, the processor 120 may calculate a converted charge capacity for a case where charging is achieved in the second charge voltage range so as to be lower than a converted charge capacity for a case where charging is achieved in the first charge voltage range.

In an embodiment, in operation 913, the electronic device 101 may count the number of charging and discharging cycles, based on the accumulative converted charge capacity.

In an embodiment, in operation 915, the electronic device 101 may identify whether the number of charging and discharging cycles exceeds a specified count. For example, if it is identified in operation 915 that the number of charging and discharging cycles exceeds the specified count, in operation 917, the processor 120 may set the full-charge voltage, which is lowered from the first full-charge voltage to the second full-charge voltage (e.g., 710→730, 720→740 in FIG. 7).

If it is identified in operation 915 that the number of charging and discharging cycles does not exceed the specified count, returning to operation 903, the processor 120 may repeat the subsequent operations while maintaining the full-charge voltage to the first full-charge voltage.

Figure 10:
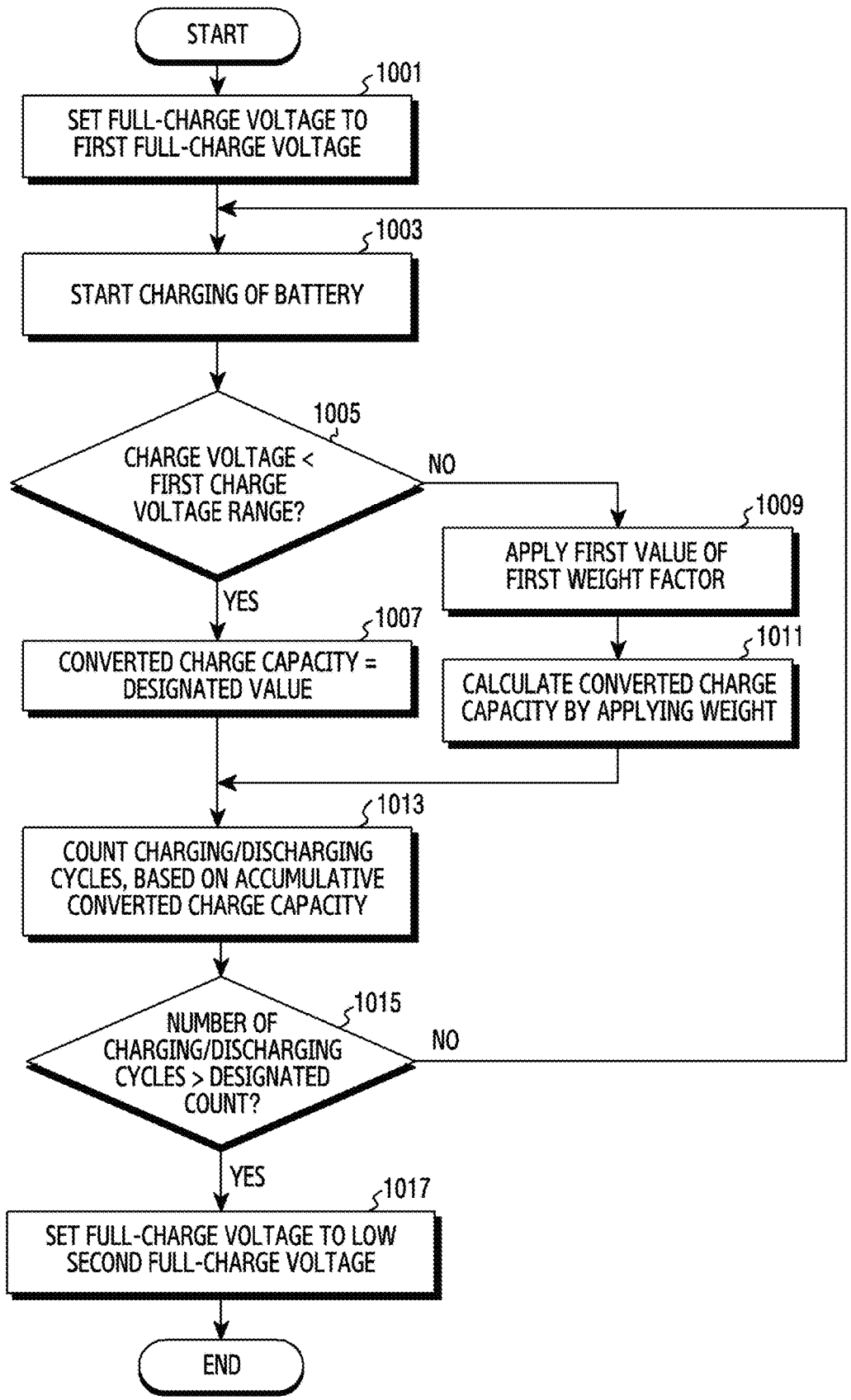
FIG. 10 illustrates a flowchart for controlling a full-charge voltage by counting the number of charging and discharging cycles, based on a charge voltage of a battery in a low-voltage range, in an electronic device according to an embodiment.

FIG. 10 illustrates a flowchart for controlling a full-charge voltage by counting the number of charging and discharging cycles, based on a charge voltage of a battery in a low-voltage range, in an electronic device according to an embodiment. Descriptions corresponding to or identical or similar to the aforementioned descriptions may be omitted in the descriptions of FIG. 10.

Referring to FIG. 10, in operation 1001, an electronic device (e.g., the electronic device 101 of FIG. 1) may set a full-charge voltage of a battery (e.g., the battery 189 of FIGS. 1 and 2) included in the electronic device 101 to a first full-charge voltage. For example, a processor (e.g., the processor 120 of FIG. 1) may set the first full-charge voltage to be higher than a second full-charge voltage of operation 1017.

In an embodiment, in operation 1003, the electronic device 101 may start charging of the battery 189 by using the power supplied from the external power device. For example, the electronic device 101 may start charging by using one of a first current value and a second current value.

In an embodiment, when the electronic device 101 is charged with the first current value, in operation 1005, the electronic device 101 may identify whether a charge voltage value belongs to a range lower than a first charge voltage range. For example, if it is identified in operation 1005 that the charge voltage value belongs to the range lower than the first charge voltage range, the charge voltage value may be called a third charge voltage. In operation 1007, the processor 120 may set a converted charge capacity at the third charge voltage to a specified value irrespective of a battery charge capacity. For example, the processor 120 may set the specified value to 50%. When the external power device is connected to the electronic device 101 two times through a connecting terminal (e.g., the connecting terminal 178 of FIG. 1), the processor 120 may calculate the converted charge capacity as 50% for each time. Accordingly, when the accumulative converted charge capacity reaches 100%, the processor 120 may count the number of charging and discharging cycles as one.

If it is identified in operation 1005 that the charge voltage value belongs to the first charge voltage range, in operation 1009, the processor 120 may apply the first value of the first weight factor to the first charge voltage range. According to an embodiment, for a case where the electronic device 101 is charged with the second current value, the processor 120 may apply the first value of the second weight factor.

In operation 1011, the electronic device 101 may calculate a converted charge capacity by applying the first weight factor or the second weight factor. In an embodiment, the processor 120 may calculate an accumulative converted charge capacity by accumulating the calculated converted charge capacity.

In an embodiment, in operation 1013, the electronic device 101 may count the number of charging and discharging cycles, based on the accumulative converted charge capacity.

In an embodiment, in operation 1015, the electronic device 101 may identify whether the number of charging and discharging cycles exceeds a specified count. For example, if it is identified in operation 1015 that the number of charging and discharging cycles exceeds the specified count, in operation 1017, the processor 120 may set the full-charge voltage, which is lowered from the first full-charge voltage to the second full-charge voltage (e.g., 710→730, 720→740 in FIG. 7).

If it is identified in operation 1015 that the number of charging and discharging cycles does not exceed the specified count, returning to operation 1003, the processor 120 may repeat the subsequent operations while maintaining the full-charge voltage to the first full-charge voltage.

Although the disclosure has been described with various embodiments, various changes and modifications may be suggested to one skilled in the art. It is intended that the disclosure encompass such changes and modifications as fall within the scope of the appended claims.

What is claimed is:

1. An electronic device comprising:
    a battery; and
    at least one processor,
    wherein the at least one processor is configured to:
       charge the battery up to a full-charge voltage of the battery;
       when the full-charge voltage of the battery is a first full-charge voltage and the battery is charged repeated by a specified count with a second current value, set the full-charge voltage of the battery to a second full-charge voltage lower than the first full-charge voltage; and
       when the full-charge voltage of the battery is the first full-charge voltage and the battery is charged repeatedly by the specified count with a first current value lower than the second current value, maintain the full-charge voltage of the battery to the first full-charge voltage.

2. The electronic device of claim 1, wherein the at least one processor is further configured to:
    when the battery is charged by a first capacity with the first current value in a first voltage range, determine a first converted charge capacity of the battery by applying a first value of a first weight factor to the first capacity; and
    when the battery is charged by the first capacity with the second current value in the first voltage range, determine a second converted charge capacity of the battery by applying a first value of a second weight factor to the first capacity.

3. The electronic device of claim 2, wherein the second weight factor is set higher than the first weight factor.

4. The electronic device of claim 2, wherein the at least one processor is configured to determine a third converted charge capacity of the battery by applying a second value of the first weight factor to the first capacity, when the battery is charged by the first capacity with the first current value in a second voltage range higher than the first voltage range.

5. The electronic device of claim 4, wherein the second value of the first weight factor is set lower than the first value of the first weight factor.

6. The electronic device of claim 2, wherein the at least one processor is further configured to determine the first converted charge capacity to a specified value irrespective of a charge capacity of the battery, when the battery is charged at a third voltage lower than the first voltage range.

7. The electronic device of claim 6, wherein the specified value is set to 50%.

8. The electronic device of claim 1, wherein the at least one processor is further configured to decrease a charge current of the battery, based on the second full-charge voltage, when the full-charge voltage of the battery is set to the second full-charge voltage.

9. A method of operating an electronic device, the method comprising:
    charging a battery of the electronic device up to a full-charge voltage of the battery;
    when the full-charge voltage of the battery is a first full-charge voltage and the battery is charged repeated by a specified count with a second current value, setting the full-charge voltage of the battery to a second full-charge voltage lower than the first full-charge voltage; and
    when the full-charge voltage of the battery is the first full-charge voltage and the battery is charged repeatedly by the specified count with a first current value lower than the second current value, maintaining the full-charge voltage of the battery to the first full-charge voltage.

10. The method of claim 9, further comprising:
    when the battery is charged by a first capacity with the first current value in a first voltage range, determining a first converted charge capacity of the battery by applying a first value of a first weight factor to the first capacity; and
    when the battery is charged by the first capacity with the second current value in the first voltage range, determining a second converted charge capacity of the battery by applying a first value of a second weight factor to the first capacity.

11. The method of claim 10, wherein the second weight factor is set higher than the first weight factor.

12. The method of claim 10, further comprising determining a third converted charge capacity of the battery by applying a second value of the first weight factor to the first capacity, when the battery is charged by the first capacity with the first current value in a second voltage range higher than the first voltage range.

13. The method of claim 12, wherein the second value of the first weight factor is set lower than the first value of the first weight factor.

14. The method of claim 10, further comprising determining the first converted charge capacity to a specified value irrespective of a charge capacity of the battery, when the battery is charged at a third voltage lower than the first voltage range.

15. The method of claim 14, wherein the specified value is set to 50%.

16. The method of claim 9, further comprising decreasing a charge current of the battery, based on the second full-charge voltage, when the full-charge voltage of the battery is set to the second full-charge voltage.

17. A recording medium containing computer-readable instructions, that when executed by a processor of an electronic device, cause the processor to:
   charge a battery of the electronic device up to a full-charge voltage of the battery;
   when the full-charge voltage of the battery is a first full-charge voltage and the battery is charged repeated by a specified count with a second current value, set the full-charge voltage of the battery to a second full-charge voltage lower than the first full-charge voltage; and
   when the full-charge voltage of the battery is the first full-charge voltage and the battery is charged repeatedly by the specified count with a first current value lower than the second current value, maintain the full-charge voltage of the battery to the first full-charge voltage.

18. The recording medium of claim 17, further containing instructions that when executed cause the processor to:
   when the battery is charged by a first capacity with the first current value in a first voltage range, determine a first converted charge capacity of the battery by applying a first value of a first weight factor to the first capacity; and
   when the battery is charged by the first capacity with the second current value in the first voltage range, determine a second converted charge capacity of the battery by applying a first value of a second weight factor to the first capacity.

19. The recording medium of claim 18, further containing instructions that when executed cause the processor to determine a third converted charge capacity of the battery by applying a second value of the first weight factor to the first capacity, when the battery is charged by the first capacity with the first current value in a second voltage range higher than the first voltage range.

20. The recording medium of claim 17, further containing instructions that when executed cause the processor to decrease a charge current of the battery, based on the second full-charge voltage, when the full-charge voltage of the battery is set to the second full-charge voltage.

* * * * *